US010849097B2

(12) United States Patent
Du et al.

(10) Patent No.: US 10,849,097 B2
(45) Date of Patent: Nov. 24, 2020

(54) INFORMATION SENDING METHOD, DEVICE, AND SYSTEM

(71) Applicant: HUAWEI TECHNOLOGIES CO., LTD., Shenzhen, Guangdong (CN)

(72) Inventors: Jun Du, Shanghai (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/400,236

(22) Filed: May 1, 2019

(65) Prior Publication Data
US 2019/0261312 A1 Aug. 22, 2019

Related U.S. Application Data

(63) Continuation of application No. PCT/CN2016/104363, filed on Nov. 2, 2016.

(51) Int. Cl.
*H04W 68/02* (2009.01)
*H04W 76/27* (2018.01)
(Continued)

(52) U.S. Cl.
CPC .............. *H04W 68/02* (2013.01); *H04W 8/22* (2013.01); *H04W 72/042* (2013.01); *H04W 76/27* (2018.02)

(58) Field of Classification Search
CPC ......... H04W 12/005; H04W 12/00502; H04W 12/00503; H04W 12/00508;
(Continued)

(56) References Cited

U.S. PATENT DOCUMENTS 9,775,185 B2 * 9/2017 Yu ........................... H04W 28/16
2008/0095119 A1 * 4/2008 Bachmann ............ H04W 12/06
370/332
(Continued)

FOREIGN PATENT DOCUMENTS

CN 101242645 A 8/2008
CN 101400042 A 4/2009
(Continued)

OTHER PUBLICATIONS

3GPP TS 36.423 V14.0.0 (Sep. 2016), "3rd Generation Partnership Project; Technical Specification Group Radio Access Network; Evolved Universal Terrestrial Radio Access Network (E-UTRAN); X2 application protocol (X2AP) (Release 14)," Technical Specification, Sep. 2016, 239 pages.
(Continued)

Primary Examiner — Jean A Gelin
(74) Attorney, Agent, or Firm — Fish & Richardson P.C.

(57) ABSTRACT

The present disclosure relates to information sending methods, and first access network devices and systems. One example system includes a first access network device and a core network device, and a connection for a terminal exists between the first access network device and the core network device. One example method includes determining that context information of the terminal is to be obtained, obtaining the context information of the terminal from the core network device. When determining that the context information of the terminal is to be obtained, the first access network device requests the context information from the core network device without storing the context information in advance.

14 Claims, 9 Drawing Sheets

(51) Int. Cl.
*H04W 72/04* (2009.01)
*H04W 8/22* (2009.01)

(58) Field of Classification Search
CPC ............. H04W 12/0051; H04W 12/06; H04W 68/005; H04W 68/02; H04W 68/025; H04W 72/042; H04W 76/27
See application file for complete search history.

(56) References Cited

U.S. PATENT DOCUMENTS

| | | | |
|---|---|---|---|
| 2008/0165740 A1* | 7/2008 | Bachmann | H04W 12/04 370/332 |
| 2011/0256855 A1* | 10/2011 | Wang | H04W 8/24 455/418 |
| 2012/0076121 A1* | 3/2012 | Choi | H04W 60/005 370/338 |
| 2012/0077509 A1* | 3/2012 | Huang | H04W 76/19 455/450 |
| 2012/0276904 A1* | 11/2012 | Bachmann | H04W 52/0235 455/436 |
| 2012/0331298 A1 | 12/2012 | Xu | |
| 2016/0309379 A1* | 10/2016 | Pelletier | H04W 76/12 |
| 2018/0019871 A1* | 1/2018 | Gage | H04W 12/0401 |
| 2019/0116483 A1* | 4/2019 | Ryu | H04W 68/02 |
| 2019/0144570 A1* | 5/2019 | Heydari | C07F 7/00 526/170 |
| 2019/0223151 A1* | 7/2019 | Li | H04W 36/0033 |
| 2019/0239147 A1* | 8/2019 | Chun | H04W 48/16 |
| 2020/0037220 A1* | 1/2020 | Velev | H04W 76/10 |

FOREIGN PATENT DOCUMENTS

| | | |
|---|---|---|
| CN | 101400143 A | 4/2009 |
| CN | 102934406 A | 2/2013 |
| WO | 2011097813 A1 | 8/2011 |

OTHER PUBLICATIONS

3GPP TS 36331 V14.0.0 (Sep. 2016), "3rd Generation Partnership Project; Technical Specification Group Radio Access Network Evolved Universal Terrestrial Radio Access (E-UTRA); Radio Resource Control (RRC); Protocol specification (Release 14)," Technical Specification, Sep. 2016, 643 pages.
PCT International Search Report and Written Opinion issued in International Application No. PCT/CN2016/104363 dated Jul. 26, 2017, 18 pages (with English translation).
R2-166920—Ericsson, "Signalling flows for paging and resume for inactive state," 3GPP TSG-RAN WG2 #95bis, Kaohsiung, Taiwan, Oct. 10-14, 2016, XP051150447, 7 pages.
Extended European Search Report issued in European Application No. 16920914.5 dated Aug. 19, 2019, 7 pages.
S2-165231 (revision of S2-165219,), Huawei, "Solutions for Inter UE QoS for NB-IoT Control Plane Optimisation", SA WG2 Meeting #116bis, Sanya, China, XP051169264, Aug. 29-Sep. 2, 2016, 5 pages.
3GPP TS 36.423 V14.0.0 (Sep. 2016), 3rd Generation Partnership Project; Technical Specification Group Radio Access Network; Evolved Universal Terrestrial Radio Access Network(E-UTRAN);X2 application protocol (X2AP)(Release 14), 239 pages.
3GPP TS 36.331 V14.0.0 (Sep. 2016), 3rd Generation Partnership Project; Technical Specification Group Radio Access Network; Evolved Universal Terrestrial Radio Access (E-UTRA); Radio Resource Control (RRC); Protocol specification (Release 14), 643 pages.
Office Action issued in Chinese Application No. 201680090573.5 dated May 6, 2020, 11 pages (with English translation).

\* cited by examiner

INFORMATION SENDING METHOD, DEVICE, AND SYSTEM

CROSS-REFERENCE TO RELATED APPLICATIONS

This application is a continuation of International Application No. PCT/CN2016/104363, filed on Nov. 2, 2016, which is hereby incorporated by reference in its entirety

TECHNICAL FIELD

The present disclosure relates to the field of communications technologies, and in particular, to an information sending method, a device, and a system.

BACKGROUND

In a wireless communications system, a terminal may access a core network (CN) by using a radio access network (RAN). For example, the terminal may access a core network device in the CN via an access network device in the RAN. After the terminal accesses the core network, the access network device needs to store context information of the terminal. However, the terminal usually has a large amount of context information, occupying a lot of storage space of the access network device. In addition, one access network device supports a relatively large quantity of terminals, and this causes very high memory costs of the access network device.

SUMMARY

Embodiments of the present disclosure describe an information sending method, a device, and a system, to reduce high memory costs of an access network device.

According to an aspect, an embodiment of the present disclosure provides an information sending method, and the method is applied to a communications system. The communications system includes a first access network device and a core network device, and a connection for a terminal exists between the first access network device and the core network device. The method includes: determining, by the first access network device, that context information of the terminal needs to be obtained; then sending, by the first access network device, a request message to the core network device, where the request message is used to request the context information of the terminal; and sending, by the core network device, a response message to the first access network device, where the response message carries the context information of the terminal. Optionally, the connection for the terminal may be an activated connection, or may be a deactivated connection.

In the solution in this embodiment of the present disclosure, when determining that the context information of the terminal needs to be obtained, the first access network device may request the context information of the terminal from the core network device without storing the context information of the terminal in advance. Therefore, in the solution in this embodiment of the present disclosure, storage space of the access network device can be saved, and memory costs of the access network device can be reduced.

The connection for the terminal may be an S1 connection for the terminal. The context information of the terminal may include at least one of the following: terminal capability information, handover restriction list information, security information, or tracking activation information.

In a possible design, the foregoing method may be applied to another communications system. The communications system includes a paging area, the paging area includes at least the first access network device, and a connection exists between the first access network device and the core network device.

In a possible design, the determining, by the first access network device, that context information of the terminal needs to be obtained may include one of the following cases:

Case 1: The first access network device receives second downlink data or second downlink signaling from the core network device, and the first access network device determines, based on the second downlink data or the second downlink signaling, that the context information of the terminal needs to be obtained.

Case 2: The first access network device receives a paging response from the terminal, and the first access network device determines, based on the paging response, that the context information of the terminal needs to be obtained.

Case 3: The first access network device receives first indication information from a second access network device, and the first access network device determines, based on the first indication information, that the context information of the terminal needs to be obtained. Optionally, when the method in this aspect can be applied to the foregoing communications system, the second access network device may belong to the foregoing paging area.

In this case, before the first access network device receives the first indication information from the second access network device, the first access network device may further receive first downlink data or first downlink signaling from the core network device, and send a paging message to the second access network device. The paging message is used to page the terminal.

Case 4: The first access network device receives second indication information from the terminal, and the first access network device determines, based on the second indication information, that the context information of the terminal needs to be obtained.

In a possible design, the request message sent by the first access network device to the core network device may be a capability enquiry message, a connection activation message, a connection restoration message, a context request message, a terminal information request message, or a capability match message. Correspondingly, the response message sent by the core network device to the first access network device may be a response message for the capability enquiry message, the connection activation message, the connection restoration message, the context request message, the terminal information request message, or the capability match message. For example, the response message is a capability enquiry response message, a connection restoration response message, a context request response message, or the like.

In a possible design, after receiving the response message from the core network device, the first access network device may further send the context information of the terminal to the second access network device. For example, the first access network device may send a context transfer message to the second access network device, and the context transfer message carries the context information of the terminal.

According to another aspect, an embodiment of the present disclosure provides another information sending method, and the method is applied to a communications system. The communications system includes a paging area, the paging area includes at least an access network device, and a connection exists between the access network device and a core network device. The method includes: receiving, by the access network device, indication information from a terminal, where the indication information is used to instruct to switch the terminal from a light connected state to a connected state; then sending, by the access network device, a first configuration message to the terminal, where the first configuration message is used to switch the terminal from the light connected state to the connected state; sending, by the access network device, a request message to the terminal, where the request message is used to request context information of the terminal; and sending, by the terminal, a response message to the access network device, where the response message carries the context information of the terminal. Optionally, the connection may be an activated connection, or may be a deactivated connection.

In this embodiment of the present disclosure, when the terminal needs to be switched from the light connected state to the connected state, after sending the first configuration message to the terminal to switch the terminal from the light connected state to the connected state, the access network device obtains the context information of the terminal from the terminal without storing the context information of the terminal in advance. Therefore, in the solution in this embodiment of the present disclosure, storage space of the access network device can be saved, and memory costs of the access network device can be reduced.

The connection may be an S1 connection for the terminal. The context information of the terminal may include terminal capability information. The access network device in this aspect may be a first access network device.

In a possible design, after sending the first configuration message to the terminal, the access network device may further receive a first configuration complete message from the terminal, and the first configuration complete message is used to indicate that the terminal has been switched from the light connected state to the connected state.

In a possible design, the access network device may further send a second configuration message to the terminal, and the second configuration message is used to configure a service capability for the terminal. Further, the access network device may receive a second configuration complete message from the terminal, and the second configuration complete message is used to indicate that the service capability has been configured for the terminal. Therefore, in the solution in this embodiment of the present disclosure, after obtaining the context information of the terminal, the access network device sends the second configuration message to the terminal, to configure the service capability for the terminal, so that the terminal can obtain abundant services.

According to still another aspect, an embodiment of the present disclosure provides a first access network device, and the first access network device has functions of implementing behavior of the first access network device in the foregoing method designs. The functions may be implemented by hardware, or may be implemented by hardware by executing corresponding software. The hardware or the software includes one or more modules corresponding to the foregoing functions.

In a possible design, the first access network device includes a processor, and the processor is configured to support the first access network device in performing a corresponding function in the foregoing method. Further, the first access network device may include a communications interface, and the communications interface is configured to support communication between the first access network device and a second access network device or a core network device. Further, the first access network device may include a memory, and the memory is configured to be coupled to the processor, and stores a program instruction and data that are necessary for the first access network device.

According to still another aspect, an embodiment of the present disclosure provides a second access network device, and the second network device has functions of implementing behavior of the second access network device in the foregoing method designs. The functions may be implemented by hardware, or may be implemented by hardware by executing corresponding software. The hardware or the software includes one or more modules corresponding to the foregoing functions.

In a possible design, the second access network device includes a processor, and the processor is configured to support the second access network device in performing a corresponding function in the foregoing method. Further, the second access network device may include a communications interface, a transmitter, and a receiver. The communications interface is configured to support communication between the second access network device and a first access network device or a core network device, and the transmitter and the receiver are configured to support communication between the second access network device and a terminal. Further, the second access network device may include a memory, and the memory is configured to be coupled to the processor, and stores a program instruction and data that are necessary for the second access network device.

According to still another aspect, an embodiment of the present disclosure provides a core network device, and the core network device has functions of implementing behavior of the core network device in the foregoing method designs. The functions may be implemented by hardware, or may be implemented by hardware by executing corresponding software. The hardware or the software includes one or more modules corresponding to the foregoing functions.

In a possible design, the core network device includes a processor, and the processor is configured to support the core network device in performing a corresponding function in the foregoing method. Further, the core network device may include a communications interface, and the communications interface is configured to support communication between the core network device and a first access network device or a second access network device. Further, the core network device may include a memory, and the memory is configured to be coupled to the processor, and stores a program instruction and data that are necessary for the core network device.

According to still another aspect, an embodiment of the present disclosure provides a terminal, and the terminal has functions of implementing behavior of the terminal in the foregoing method designs. The functions may be implemented by hardware, or may be implemented by hardware by executing corresponding software. The hardware or the software includes one or more modules corresponding to the foregoing functions.

In a possible design, the terminal includes a processor, and the processor is configured to support the terminal in performing a corresponding function in the foregoing method. Further, the terminal may include a transmitter and a receiver, and the transmitter and the receiver are configured to support communication between the terminal and an access network device. Further, the terminal may include a memory, and the memory is configured to be coupled to the processor, and stores a program instruction and data that are necessary for the terminal.

According to still another aspect, an embodiment of the present disclosure provides a communications system, where the system includes the first access network device and the second access network device described in the foregoing aspects; or the system includes the first access network device, the second access network device, and the core network device described in the foregoing aspects.

According to yet another aspect, an embodiment of the present disclosure provides a computer storage medium, configured to store a computer software instruction used by the foregoing first access network device, where the computer software instruction includes a program designed to perform the foregoing aspects.

According to yet another aspect, an embodiment of the present disclosure provides a computer storage medium, configured to store a computer software instruction used by the foregoing second access network device, where the computer software instruction includes a program designed to perform the foregoing aspects.

According to yet another aspect, an embodiment of the present disclosure provides a computer storage medium, configured to store a computer software instruction used by the foregoing core network device, where the computer software instruction includes a program designed to perform the foregoing aspects.

According to yet another aspect, an embodiment of the present disclosure provides a computer storage medium, configured to store a computer software instruction used by the foregoing terminal, where the computer software instruction includes a program designed to perform the foregoing aspects.

In comparison with the prior art, in the solutions in the embodiments of the present disclosure, after receiving signaling destined for the terminal that is sent by the core network device, the first access network device sends a paging message to the second access network device. When receiving the first indication information sent by the second access network device, the first access network device can learn that the terminal has accessed the second access network device, and then perform proper subsequent processing.

In comparison with the prior art, in the solutions in the embodiments of the present disclosure, when determining that the context information of the terminal needs to be obtained, the first access network device may request the context information of the terminal from the core network device without storing the context information of the terminal in advance. Therefore, in the solutions in the embodiments of the present disclosure, storage space of the access network device can be saved, and memory costs of the access network device can be reduced.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and a person of ordinary skill in the art may derive other drawings from these accompanying drawings without creative efforts.

DESCRIPTION OF EMBODIMENTS

To make the objectives, technical solutions, and advantages of the embodiments of the present disclosure clearer, the following describes the technical solutions in the embodiments of the present disclosure with reference to the accompanying drawings in the embodiments of the present disclosure.

A network architecture and a service scenario described in the embodiments of the present disclosure are intended to more clearly describe the technical solutions in the embodiments of the present disclosure, and constitute no limitation to the technical solutions provided in the embodiments of the present disclosure. A person of ordinary skill in the art may know that as the network architecture evolves and a new service scenario emerges, the technical solutions provided in the embodiments of the present disclosure are also applicable to a similar technical problem.

Some possible application scenarios and network architectures to which the embodiments of the present disclosure are applicable are first described below with reference to FIG. 1, FIG. 2A, and FIG. 2B.

Figure 1:
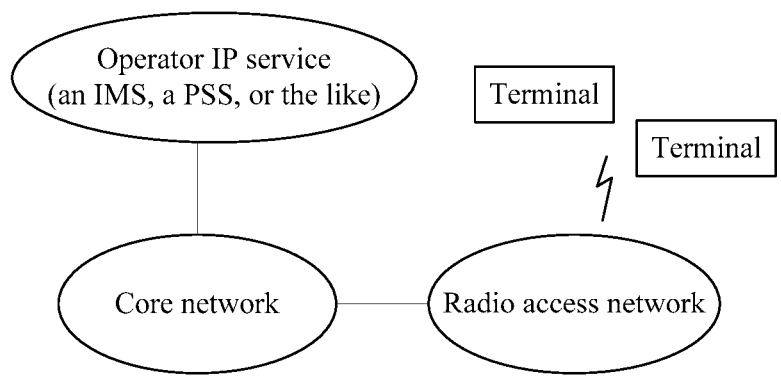
FIG. 1 is a schematic diagram of a possible application scenario according to an embodiment of the present disclosure.

FIG. 1 shows an application scenario to which the embodiments of the present disclosure are applicable. As shown in FIG. 1, a terminal uses a radio access network and a core network to access an operator Internet Protocol (IP) service network, for example, an IP multimedia subsystem (IMS) network or a packet-switched streaming service (PSS) network. The technical solutions described in the present disclosure are applicable to a Long Term Evolution (LTE) system, or other wireless communications systems using various radio access technologies, for example, systems using access technologies such as Code Division Multiple Access (CDMA), Frequency Division Multiple Access (FDMA), Time Division Multiple Access (TDMA), orthogonal frequency division multiple access (OFDMA), and single carrier frequency division multiple access (SC-FDMA). In addition, the technical solutions may further be applicable to a subsequent evolved system of the LTE system, for example, a 5th generation (5G) system. For clarity, only the LTE system is used as an example herein for description. In the LTE system, an evolved universal terrestrial radio access network (E-UTRAN) is used as a radio access network, and an evolved packet core (EPC) is used as a core network. The terminal accesses the IMS network via the E-UTRAN and the EPC. It should be noted that when the solutions in the embodiments of the present disclosure are applied to the 5G system or another system that may occur in the future, names of the access network device and the terminal may change, but this does not affect implementation of the solutions in the embodiments of the present disclosure.

Figure 2A:
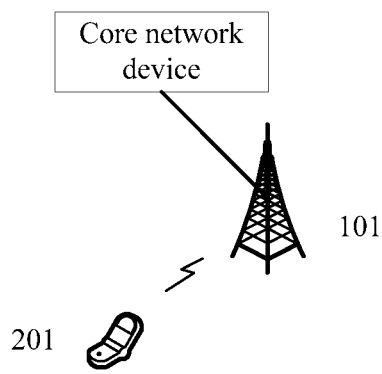
FIG. 2A is a schematic diagram of a possible network architecture according to an embodiment of the present disclosure.

Based on the foregoing application scenario, FIG. 2A shows a possible network architecture according to an embodiment of the present disclosure. As shown in FIG. 2A, the network architecture includes a core network device, an access network device 101, and a terminal 201. For example, the terminal 201 may access the core network device via the access network device 101. The core network device is connected to the access network device 101, and the access network device 101 and the terminal 201 may wirelessly communicate with each other.

Figure 2B:
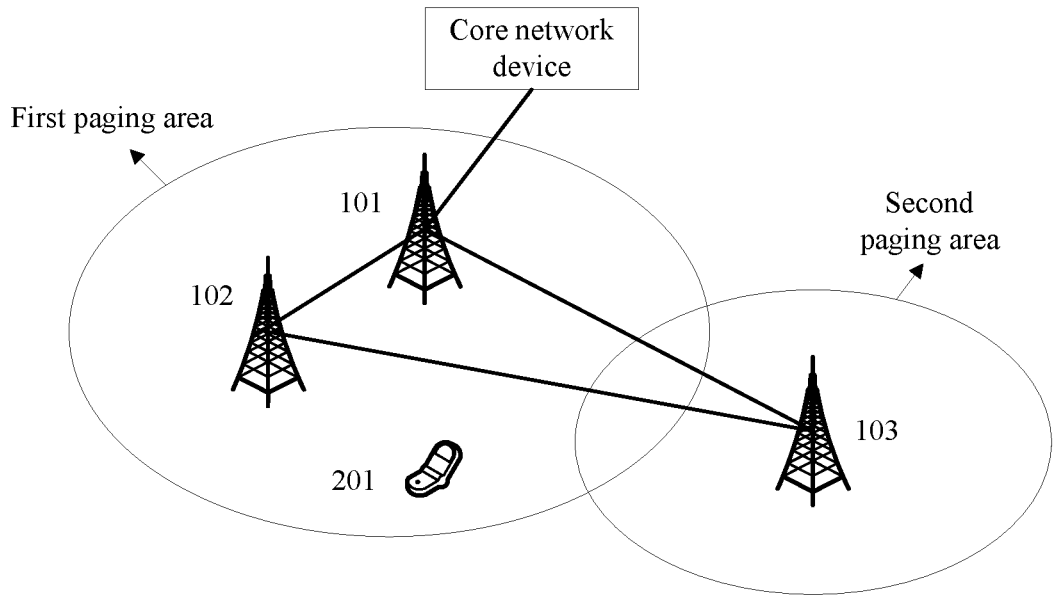
FIG. 2B is a schematic diagram of another possible network architecture according to an embodiment of the present disclosure.

Based on the foregoing application scenario, FIG. 2B shows another possible network architecture according to an embodiment of the present disclosure. As shown in FIG. 2B, the network architecture includes a core network device, a terminal 201, and a plurality of access network devices 101, 102, and 103. The access network device 101 and the access network device 102 are in a same paging area, for example, a first paging area. The access network device 103 is in another paging area, for example, a second paging area. The access network device 101 may be referred to as an anchor access network device in the first paging area. The anchor access network device is an access network device that stores context information of the terminal and that maintains a connection between the terminal and the core network device. The anchor access network device is connected to the core network device and is connected to another access network device in the first paging area. In FIG. 2B, the terminal 201 is in a light connected state. That the terminal is in a light connected state means that an interface between the terminal and the core network device is kept on the anchor access network device, and the terminal does not need to notify the anchor access network device when moving within a particular area, and notifies the anchor access network device only when moving out of the particular area. For example, the terminal 201 may maintain the interface between the terminal 201 and the core network device by using the access network device 101 in the first paging area, and the terminal 201 does not need to notify the access network device 101 when moving within the first paging area, and notifies the access network device 101 only when moving out of the first paging area.

The light connected state in this embodiment of the present disclosure may be a substrate of a radio resource control (RRC) connected mode, or may be an enhanced state of an idle mode, or may be an independent state. The light connected state may have another name, for example, the light connected state may also be referred to as an inactive state, a deactivated state, a low active state, a low overhead state, or the like. A name or form of the light connected state is not limited in this embodiment of the present disclosure.

The paging area in the network architecture shown in FIG. 2B may be a name for a cell set, and the cell set is managed by the access network device. When moving within the cell set, the terminal does not need to notify an access network device that performs a paging area configuration for the terminal. When moving out of the cell set, the terminal needs to notify the access network device. When the access network device in the cell set needs to communicate with the terminal, the access network device needs to page the terminal within all cells included in the cell set. It should be noted that the paging area may also be referred to as a registration area of the terminal, a light connected area of the terminal, a management area of the terminal, an access network registration area of the terminal, a tracking area of the terminal, an access network tracking area of the terminal, or the like. This is not limited in this embodiment of the present disclosure.

In the embodiments of the present disclosure, terms "network" and "system" are usually used interchangeably, but a person skilled in the art may understand meanings of the terms. The terminal in the embodiments of the present disclosure may include various handheld devices, in-vehicle devices, wearable devices, computing devices that have a wireless communication function, or another processing device connected to a wireless modem, and user equipment (UE), a mobile station (MS), a terminal device, and the like in various forms. For ease of description, the devices mentioned above are collectively referred to as the terminal. The access network device in the embodiments of the present disclosure is an apparatus that is deployed in a radio access network and that is configured to provide a wireless communication function for the terminal. For example, the access network device may be a base station (Base Station, BS), and the base station may include a macro base station, a micro base station, a relay station, an access point, and the like in various forms. In systems using different radio access technologies, a device having a base station function may have different names. For example, in a Long Term Evolution (Long Term Evolution, LTE) system, the device is referred to as an evolved NodeB (evolved NodeB, eNB or eNodeB); in a 3rd generation (3G) communications system, the device is referred to as a NodeB. For ease of description, in the embodiments of the present disclosure, the foregoing apparatuses providing a wireless communication function for the terminal are collectively referred to as the access network device. The core network device in the embodiments of the present disclosure may include different devices in different systems. For example, in the LTE system, the core network device may include a mobility management entity (MME) or a serving gateway (SGW); in the 3G communications system, the core network device may include a serving GPRS support node (SGSN) or a gateway GPRS support node (GGSN). GPRS is an acronym for a general packet radio system. The core network device in the embodiments of the present disclosure may further include a core network device in a 5G system or in another system that may occur in the future.

The embodiments of the present disclosure are further described below in detail based on a common aspect in the foregoing embodiments of the present disclosure.

In an existing solution, after a terminal accesses a core network, an access network device needs to store context information of the terminal. For example, when the terminal is in a connected state, the access network device needs to store the context information of the terminal. For another example, when the terminal is in a light connected state, an anchor access network device needs to store the context information of the terminal. If the terminal has moved into an area of another access network device when the terminal is awakened, the anchor access network device further needs to migrate the context information of the terminal to the another access network device. That the terminal is awakened means that the terminal is switched from the light connected state to the connected state.

Figure 2C:
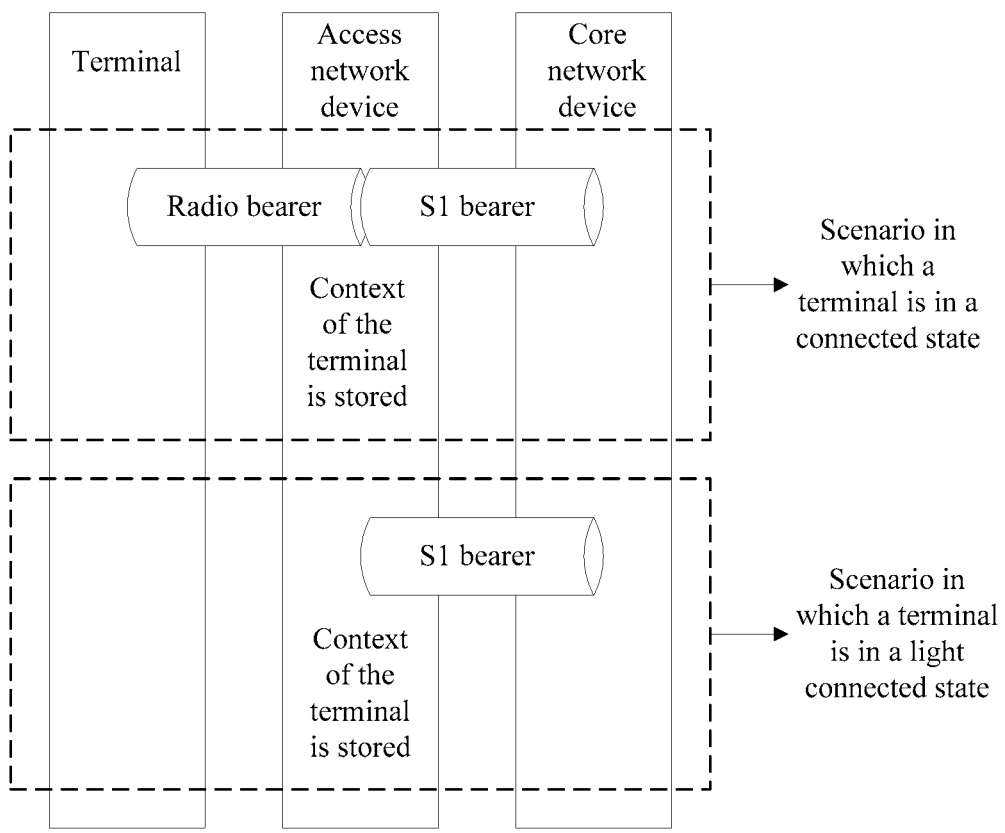
FIG. 2C is a possible schematic diagram of an existing solution.

The foregoing existing solution is described below by using an example with reference to FIG. 2C. As shown in FIG. 2C, when a terminal is in a connected state, a radio bearer exists between the terminal and an access network device, an S1 bearer exists between the access network device and a core network device, and the access network device stores context information of the terminal. When the terminal is in a light connected state, an S1 bearer exists between the access network device and the core network device, and the access network device stores the context information of the terminal. It may be understood that for the terminal, that an S1 bearer exists between the access network device and the core network device means that a connection for the terminal exists between the access network device and the core network device.

However, the terminal usually has a large amount of context information, occupying a lot of storage space of the access network device. In addition, one access network device supports a relatively large quantity of terminals, and this causes very high memory costs of the access network device.

In view of this, an embodiment of the present disclosure provides an information sending method, and an access network device, a core network device, a terminal, and a system that are based on the method. The method is applied to a communications system. The communications system includes a first access network device and a core network device, and a connection for a terminal exists between the first access network device and the core network device. The method includes: determining, by the first access network device, that context information of the terminal needs to be obtained; sending, by the first access network device, a request message to the core network device, where the request message is used to request the context information of the terminal; and sending, by the core network device, a response message to the first access network device, where the response message carries the context information of the terminal. Optionally, the connection for the terminal may be an activated connection, or may be a deactivated connection. For example, the connection for the terminal may be an S1 connection for the terminal. In this embodiment of the present disclosure, when determining that the context information of the terminal needs to be obtained, the first access network device may request the context information of the terminal from the core network device without storing the context information of the terminal in advance. It can be learned from above that in the solution in this embodiment of the present disclosure, storage space of the access network device can be saved, and memory costs of the access network device can be reduced.

The solution provided in this embodiment of the present disclosure is described below with reference to FIG. 3.

Step 301: A first access network device determines that context information of a terminal needs to be obtained.

In an example, that a first access network device determines that context information of a terminal needs to be obtained may include one of the following cases:

Case 1: The first access network device receives second downlink data or second downlink signaling from a core network device, and the first access network device determines, based on the second downlink data or the second downlink signaling, that the context information of the terminal needs to be obtained. For example, after receiving the second downlink data or the second downlink signaling, the first access network device learns that the second downlink data or the second downlink signaling is to be sent to the terminal. However, the first access network device does not locally store the context information of the terminal, and therefore determines that the context information of the terminal needs to be obtained, to send the second downlink data or the second downlink signaling to the terminal.

Case 2: The first access network device receives a paging response from the terminal, and the first access network device determines, based on the paging response, that the context information of the terminal needs to be obtained. For example, after receiving the paging response from the terminal, the first access network device finds that the context information of the terminal is not locally stored, and therefore determines that the context information of the terminal needs to be obtained, to ensure subsequent communication between the first access network device and the terminal.

Case 3: The first access network device receives first indication information from a second access network device, and the first access network device determines, based on the first indication information, that the context information of the terminal needs to be obtained. For example, after receiving the first indication information from the second access network device, the first access network device learns that the second access network device needs the context information of the terminal. However, the first access network device does not locally store the context information of the terminal, and therefore determines that the context information of the terminal needs to be obtained, to send the context information of the terminal to the second access network device.

In this case, before the first access network device receives the first indication information from the second access network device, the first access network device may further receive first downlink data or first downlink signaling from the core network device, and send a paging message to the second access network device. The paging message is used to page the terminal.

Case 4: The first access network device receives second indication information from the terminal, and the first access network device determines, based on the second indication information, that the context information of the terminal needs to be obtained. For example, after receiving the second indication information from the terminal, the first access network device learns that the terminal needs to be switched from a light connected state to a connected state. However, the first access network device does not locally store the context information of the terminal, and therefore determines that the context information of the terminal needs to be obtained, to switch the terminal from the light connected state to the connected state by using the context information of the terminal.

In an example, the context information of the terminal may include at least one of the following: terminal capability information, handover restriction list information, security information, or tracking activation information. The terminal capability information, the handover restriction list information, the security information, or the tracking activation information is briefly described below.

The terminal capability information may include at least one of the following: a terminal capability level (for example, UE-Category), access stratum protocol information (for example, accessStratumRelease information) of the terminal, information about a frequency band supported by the terminal (for example, supportedBandlistEUTRA information), a carrier aggregation (CA) or dual connectivity (DC) capability supported by the terminal (for example, supportedBandCombination/dc-Support-r12), or an inter-frequency and inter-RAT measurement capability (for example, interFreqNeedForGaps and interRAT-NeedForGaps) of the terminal.

The handover restriction list information is reference information used to constrain an access stratum device from selecting a service for the terminal or constrain the terminal from moving to a target radio access technology or radio access stratum instance. The handover restriction list information may include restriction information of a public land mobile network (PLMN) or a radio access technology (RAT) in which a handover is forbidden.

Security information is a security algorithm that may be used by the terminal, information used for a security activity such as delivering a key, or the like. For example, the security information may include a terminal security capability (for example, UE security capabilities) or a security key.

The tracking activation information may include a tracking code, configuration information of minimization of drive tests (MDT), and the like.

Step 302: The first access network device sends a request message to a core network device, where the request message is used to request the context information of the terminal.

In an example, the request message may be a capability enquiry (for example, UE capability enquiry) message, a connection activation message, a connection restoration message, a context request message, a terminal information request message (for example, UE information request), or a capability match message (for example, a UE radio capability match request).

Step 303: The core network device sends a response message to the first access network device, where the response message carries the context information of the terminal.

In an example, the response message may be a response message for the capability enquiry message, the connection activation message, the connection restoration message, the context request message, the terminal information request message, or the capability match message. For example, the response message is a capability enquiry response, a connection restoration response message, a context request response message, or the like.

In an example, after receiving the response message from the core network device, the first access network device may further send the context information of the terminal to the second access network device. For example, the first access network device may send a context transfer message to the second access network device, and the context transfer message carries the context information of the terminal.

Figure 3:
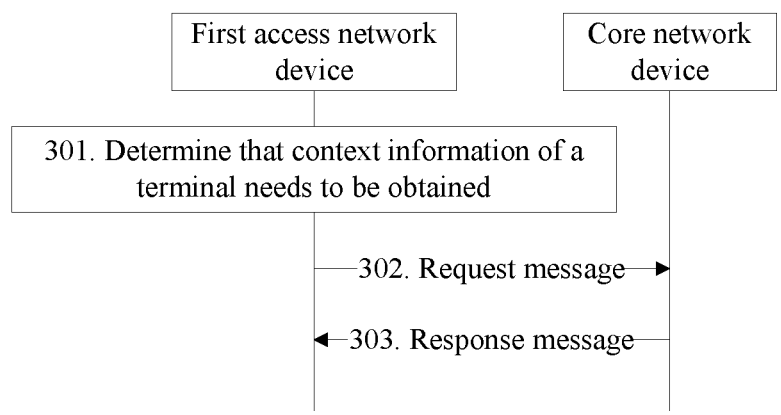
FIG. 3 is a schematic communication diagram of an information sending method according to an embodiment of the present disclosure.

The method shown in FIG. 3 may be applied to the network architecture shown in FIG. 2A or FIG. 2B. For example, when the method shown in FIG. 3 is applied to the network architecture shown in FIG. 2B, the method may be applied to another communications system. The communications system includes a paging area, the paging area includes at least the first access network device, and a connection exists between the first access network device and the core network device. In this case, the second access network device may belong to the paging area.

Based on the method shown in FIG. 3, the solution provided in this embodiment of the present disclosure is further described below with reference to FIG. 4. For content in the method shown in FIG. 4 that is the same as or similar to that in the method shown in FIG. 3, refer to detailed descriptions in the embodiment of FIG. 3. Details are not described herein again.

Figure 4:
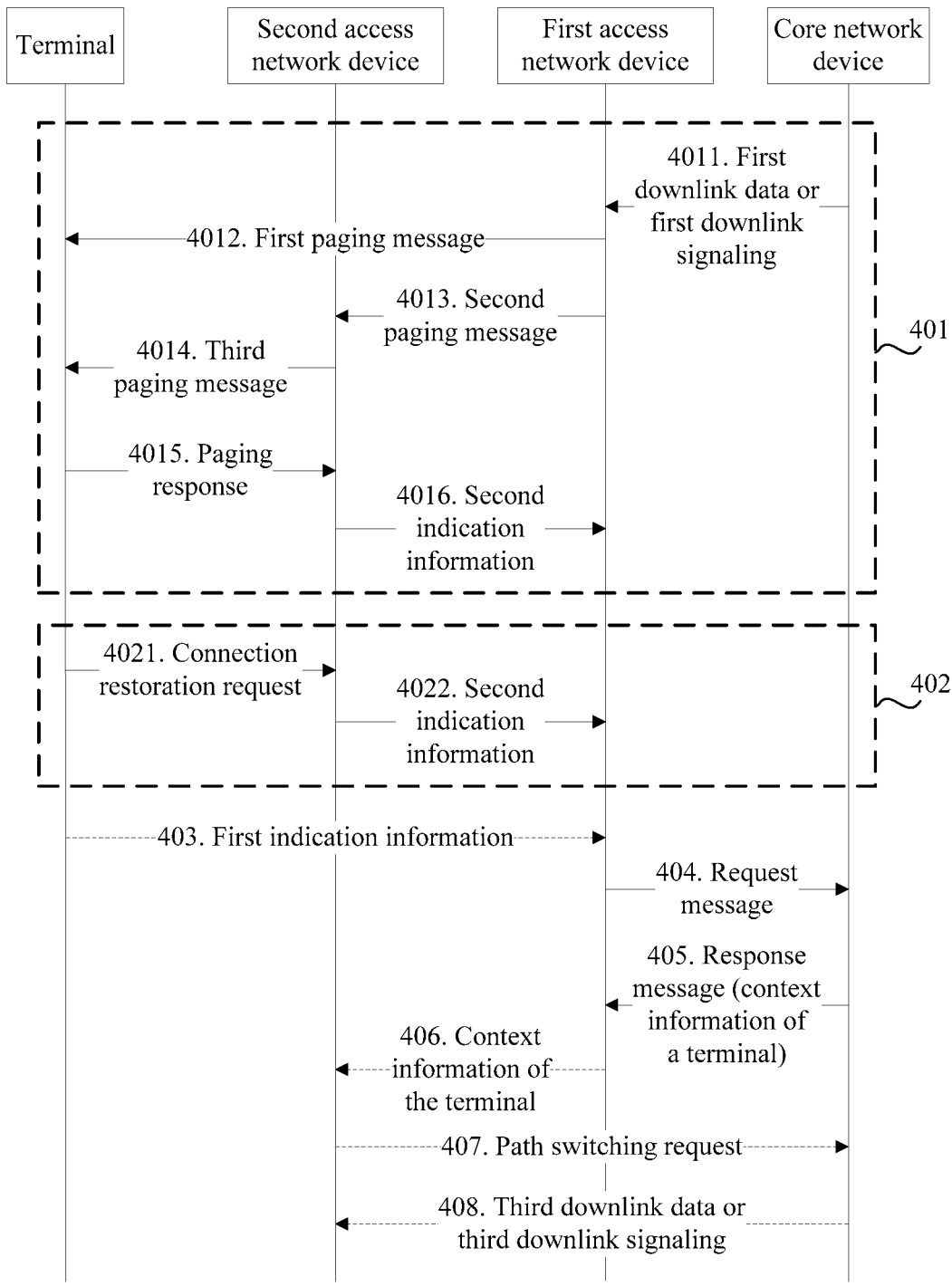
FIG. 4 is a schematic communication diagram of another information sending method according to an embodiment of the present disclosure.

It should be noted that the method shown in FIG. 4 may be applied to the network architecture shown in FIG. 2B. In the method shown in FIG. 4, a process in which a first access network device determines that context information of a terminal needs to be obtained is described by using an example in which the first access network device receives first indication information from a second access network device, or the first access network device receives second indication information from the terminal. Steps 401 to 403 are respectively three different cases in which the first access network device receives the first indication information or the second indication information, and are optional steps. During implementation of the method shown in FIG. 4, it is only required to perform any one of the cases in the steps 401 to 403. In other words, after step 401, step 402, or step 403 is performed, step 404 is to be performed.

Step 401 is one case in which the first access network device receives the second indication information from the second access network device, and may specifically include steps 4011 to 4016. Step 401 may be understood as a case in which first downlink data or first downlink signaling triggers the terminal to be switched from a light connected state to a connected state.

Step 4011: A core network device sends the first downlink data or the first downlink signaling to the first access network device.

Step 4012: The first access network device sends a first paging message to the terminal.

Step 4013: The first access network device sends a second paging message to the second access network device, where the paging message is used to page the terminal.

Step 4014: The second access network device sends a third paging message to the terminal.

Step 4015: The terminal sends a paging response to the second access network device.

It can be learned from step 4015 that when the terminal separately receives the first paging message sent by the first access network device and the third paging message sent by the second access network device, the terminal does not send a paging response to the first access network device. Therefore, it can be learned that the terminal has moved out of an area of the first access network device.

Step 4016: The second access network device sends the second indication information to the first access network device, where the second indication information may be used to instruct to switch the terminal from the light connected state to the connected state.

Step 402 is another case in which the first access network device receives the second indication information from the second access network device, and may specifically include step 4021 and step 4022. Step 402 may be understood as a case in which the terminal actively needs to be switched from the light connected state to the connected state within an area of the second access network device.

Step 4021: The terminal sends a connection restoration request message to the second access network device. For example, the terminal in the light connected state needs to perform a service, and therefore sends the connection restoration request message to the second access network device, to transmit a service after being switched to the connected state.

Optionally, in step 4021, the terminal may not send the connection restoration request message to the second access network device but sends a status switching indication to the second access network device, and the status switching indication is used to instruct to switch the terminal from the light connected state to the connected state. A specific implementation of the status switching indication is not limited in this embodiment of the present disclosure.

Step 4022: The second access network device sends the second indication information to the first access network device, where the second indication information may be used to instruct to switch the terminal from the light connected state to the connected state.

Step 403 is a case in which the first access network device receives the first indication information from the terminal. Step 403 may be understood as a case in which the terminal actively needs to be switched from the light connected state to the connected state within an area of the first access network device.

Step 403: The terminal sends the first indication information to the first access network device, where the first indication information is used to instruct to switch the terminal from the light connected state to the connected state.

Optionally, in step 403, the terminal may not send the first indication information to the first access network device but sends a connection restoration request message to the first access network device. For example, the terminal in the light connected state needs to perform a service, and therefore sends the connection restoration request message to the first access network device, to transmit a service after being switched to the connected state.

Step 404 and step 405 are respectively similar to step 302 and step 303 in FIG. 3, and reference may be made to detailed descriptions of step 302 and step 303. Details are not described herein again.

Optionally, the method shown in FIG. 4 may further include steps 406 to 408. For example, when the method shown in FIG. 4 includes step 401 or step 402, the steps 406 to 408 continue to be performed after step 405 is performed.

Step 406: The first access network device sends the context information of the terminal to the second access network device, so that after receiving the context information of the terminal, the second access network device may switch the terminal from the light connected state to the connected state.

For description of the context information of the terminal, refer to detailed descriptions of step 302 in FIG. 3. Details are not described herein again.

In an example, the first access network device may send a context transfer message to the second access network device, and the context transfer message carries the context information of the terminal.

Step 407: The second access network device sends a path switching request to the core network device, so that after receiving the path switching request sent by the second access network device, the core network device can learn that the terminal has been moved into the area of the second access network device.

Step 408: The core network device sends third downlink data or third downlink signaling to the second access network device.

An embodiment of the present disclosure further provides an information sending method, and an access network device, a terminal, and a system that are based on the method. The method is applied to a communications system. The communications system includes a paging area, the paging area includes at least an access network device, and a connection exists between the access network device and a core network device. The method includes: sending, by a terminal, indication information to the access network device, where the indication information is used to instruct to switch the terminal from a light connected state to a connected state; sending, by the access network device, a first configuration message to the terminal, where the first configuration message is used to switch the terminal from the light connected state to the connected state; sending, by the access network device, a request message to the terminal, where the request message is used to request context information of the terminal; and sending, by the terminal, a response message to the access network device, where the response message carries the context information of the terminal. Optionally, the connection may be an activated connection, or may be a deactivated connection. For example, the connection may be an S1 connection for the terminal. In this embodiment of the present disclosure, when the terminal needs to be switched from the light connected state to the connected state, after sending the first configuration message to the terminal to switch the terminal from the light connected state to the connected state, the access network device obtains the context information of the terminal from the terminal without storing the context information of the terminal in advance. It can be learned from above that in the solution in this embodiment of the present disclosure, storage space of the access network device can be saved, and memory costs of the access network device can be reduced.

The solution provided in this embodiment of the present disclosure is described below with reference to FIG. 5. The method shown in FIG. 5 may be applied to a communications system. The communications system includes a paging area, the paging area includes at least an access network device, and a connection exists between the access network device and a core network device. The method includes steps 501 to 504. The access network device in the method shown in FIG. 5 may be a first access network device.

Step 501: A terminal sends a status switching indication to the access network device, where the status switching indication is used to instruct to switch the terminal from a light connected state to a connected state.

Optionally, the terminal may not send the status switching indication to the access network device but sends a connection restoration request message to the access network device. For example, the terminal in the light connected state needs to perform a service, and therefore sends the connection restoration request message to a second access network device, to transmit a service after being switched to the connected state.

Step 502: The access network device sends a first configuration message to the terminal, where the first configuration message is used to switch the terminal from the light connected state to the connected state.

The first configuration message may be a radio resource control (Radio Resource Control, RRC) connection reconfiguration (RRC connection reconfiguration) message.

In an example, the access network device may further receive a first configuration complete message from the terminal, and the first configuration complete message is used to indicate that the terminal has been switched from the light connected state to the connected state. The first configuration complete message may be an RRC connection reconfiguration complete (RRC connection reconfiguration complete) message.

After step 502 is performed, the terminal may access the access network device, so that the access network device may request required information from the terminal.

Step 503: The access network device sends a request message to the terminal, where the request message is used to request context information of the terminal.

In an example, the context information of the terminal may be terminal capability information. For description of the terminal capability information, refer to detailed descriptions of step 301 in the method shown in FIG. 3. Details are not described herein again.

Step 504: The terminal sends a response message to the access network device, where the response message carries the context information of the terminal.

In an example, the access network device may further send a second configuration message to the terminal, and the second configuration message is used to configure a service capability for the terminal. Further, the access network device may receive a second configuration complete message from the terminal, and the second configuration complete message is used to indicate that the service capability has been configured for the terminal. The second configuration message may be an RRC connection reconfiguration message, and the second configuration complete message may be an RRC connection reconfiguration complete message.

Based on the method shown in FIG. 5, the solution provided in this embodiment of the present disclosure is further described below with reference to FIG. 6. For content in the method shown in FIG. 6 that is the same as or similar to that in the method shown in FIG. 5, refer to detailed descriptions in the embodiment of FIG. 5. Details are not described herein again. An access network device in the method shown in FIG. 6 may be a first access network device.

Figure 5:
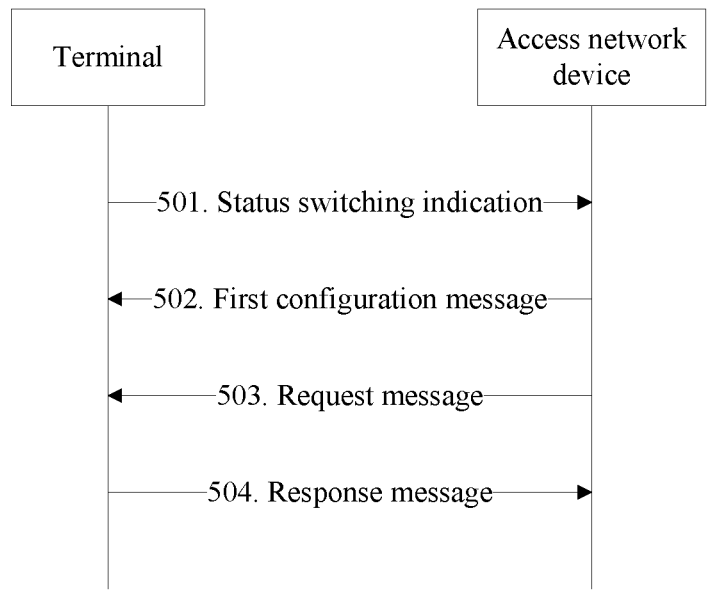
FIG. 5 is a schematic communication diagram of still another information sending method according to an embodiment of the present disclosure.
Figure 6:
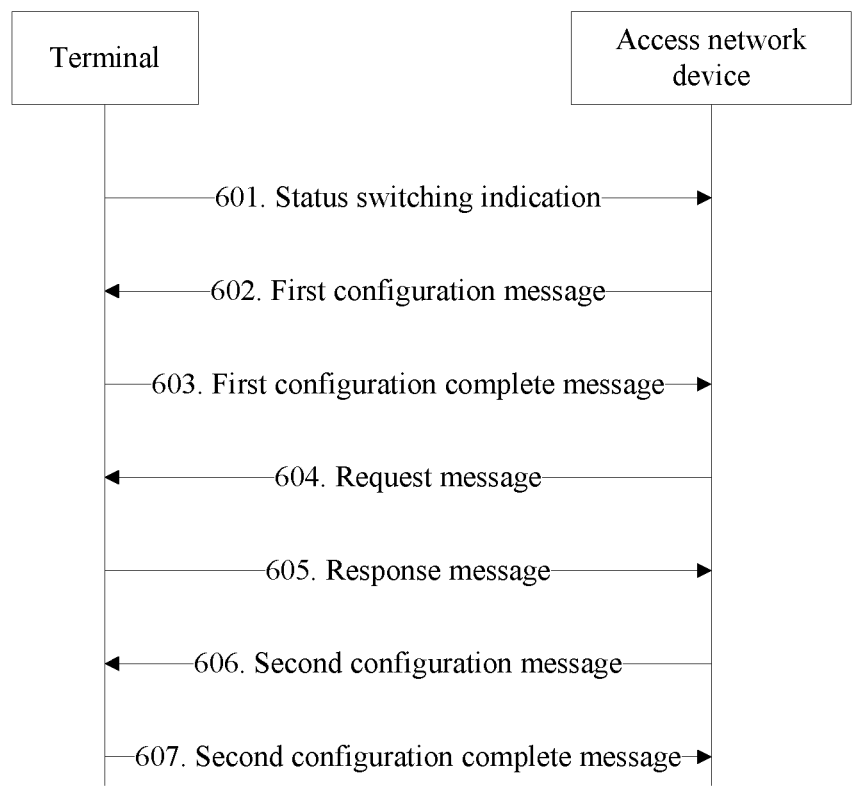
FIG. 6 is a schematic communication diagram of yet another information sending method according to an embodiment of the present disclosure.

Step 601 and step 602 are respectively similar to step 501 and step 502 in FIG. 5, and reference may be made to detailed descriptions of step 501 and step 502. Details are not described herein again.

Step 603: The terminal sends a first configuration complete message to the access network device, where the first configuration complete message is used to indicate that the terminal has been switched from the light connected state to the connected state.

Step 604 and step 605 are respectively similar to step 503 and step 504 in FIG. 5, and reference may be made to detailed descriptions of step 503 and step 504. Details are not described herein again.

Step 606: The access network device sends a second configuration message to the terminal, where the second configuration message is used to configure a service capability for the terminal.

Step 607: The terminal sends a second configuration complete message to the access network device, where the second configuration complete message is used to indicate that the service capability has been configured for the terminal.

In this embodiment of the present disclosure, when the terminal needs to be switched from the light connected state to the connected state, after sending the first configuration message to the terminal to switch the terminal from the light connected state to the connected state, the access network device obtains the context information of the terminal from the terminal without storing the context information of the terminal in advance. It can be learned from above that in the solution in this embodiment of the present disclosure, storage space of the access network device can be saved, and memory costs of the access network device can be reduced. Further, after obtaining the context information of the terminal, the access network device may send the second configuration message to the terminal, to configure the service capability for the terminal, so that the terminal can obtain abundant services.

The foregoing mainly describes the solutions provided in the embodiments of the present disclosure from the perspective of interaction between different network elements. It may be understood that to implement the foregoing functions, the first access network device, the second access network device, the core network device, and the terminal each include a corresponding hardware structure and/or software module for performing each function. With reference to units and algorithm steps in each example described in the embodiments disclosed in the present disclosure, the embodiments of the present disclosure can be implemented in a form of hardware or a combination of hardware and computer software. Whether the functions are performed by hardware or hardware driven by computer software depends on particular applications and design constraints of the technical solutions. A person skilled in the art may use different methods for each particular application to implement the described functions, but it should not be considered that the implementation goes beyond the scope of the technical solutions in the embodiments of the present disclosure.

The first access network device, the second access network device, the core network device, the terminal, and the like may be divided into functional units according to the foregoing method examples in the embodiments of the present disclosure. For example, each functional unit may be obtained through division based on each corresponding function, or two or more functions may be integrated into one processing unit. The integrated unit may be implemented in a form of hardware, or may be implemented in a form of a software functional unit. It should be noted that the unit division in the embodiments of the present disclosure is an example, and is merely logical function division. There may be other division in actual implementation.

Figure 7:
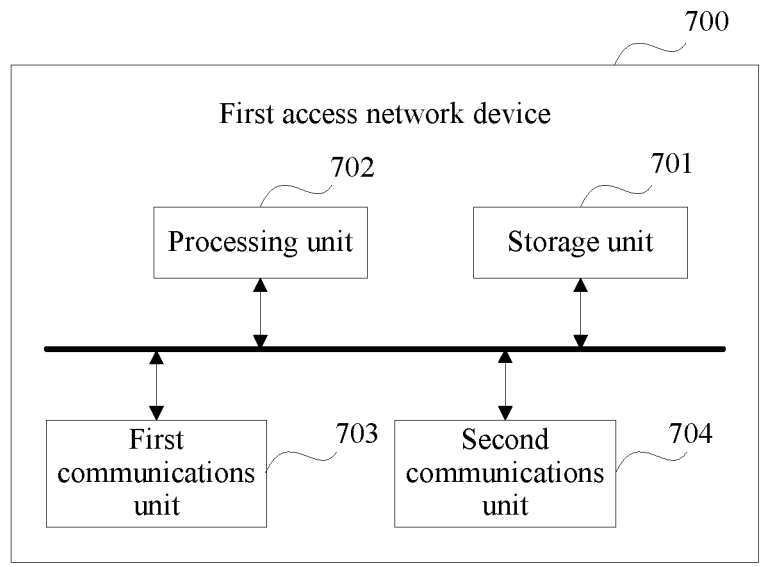
FIG. 7 is a schematic block diagram of a first access network device according to an embodiment of the present disclosure.

When an integrated unit is used, FIG. 7 is a schematic block diagram of a first access network device according to an embodiment of the present disclosure. A first access network device 700 includes a processing unit 702 and a first communications unit 703. The processing unit 702 is configured to control and manage actions of the first access network device 700. For example, the processing unit 702 is configured to support the first access network device 700 in performing the processes 301 and 302 in FIG. 3, the processes 4012, 4013, 404, and 406 in FIG. 4, the processes 502 and 503 in FIG. 5, the processes 602, 604, and 606 in FIG. 6, and/or other processes of the technical solutions described in this specification. The first communications unit 703 is configured to support communication between the first access network device 700 and another network element (for example, a second access network device, a core network device, or the like). The first access network device 700 may further include a second communications unit 704, configured to support communication between the first access network device 700 and a terminal. The first access network device 700 may further include a storage unit 701, configured to store program code and data of the first access network device 700.

The processing unit 702 may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or a combination thereof. The processor/controller may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The first communications unit 703 may be a communications interface. The communications interface is a general term. In specific implementation, the communications interface may include a plurality of interfaces, for example, may include an interface between access network devices, an interface between an access network device and a core network device, and/or another interface. The second communications unit 704 may be a transceiver, a transceiver circuit, or the like. The storage unit 701 may be a memory.

Figure 8:
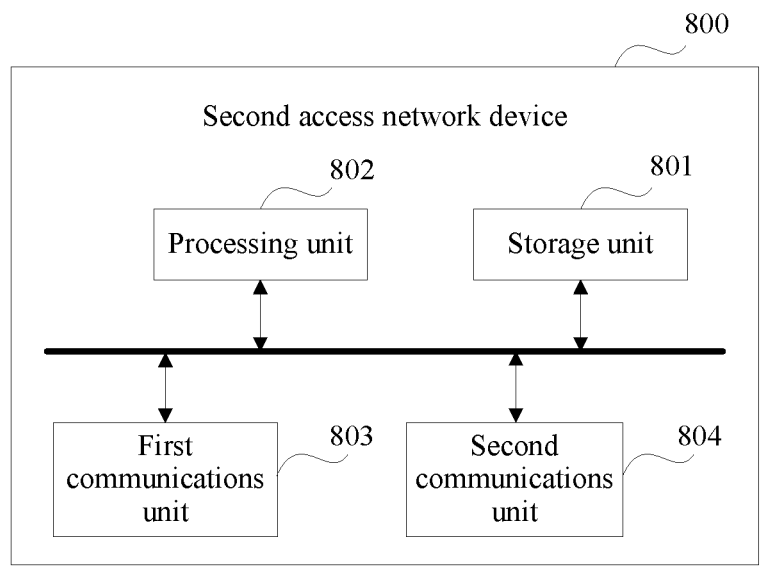
FIG. 8 is a schematic block diagram of a second access network device according to an embodiment of the present disclosure.

When an integrated unit is used, FIG. 8 is a schematic block diagram of a second access network device according to an embodiment of the present disclosure. A second access network device 800 includes a processing unit 802, a first communications unit 803, and a second communications unit 804. The processing unit 802 is configured to control and manage actions of the second access network device 800. For example, the processing unit 802 is configured to support the second access network device 800 in performing the processes 4014, 4016, 4022, and 407 in FIG. 4, and/or other processes of the technical solutions described in this specification. The first communications unit 803 is configured to support communication between the second access network device 800 and another access network device or a core network device. The second communications unit 804 is configured to support communication between the second access network device 800 and a terminal. The second access network device 800 may further include a storage unit 801, configured to store program code and data of the second access network device 800.

The processing unit 802 may be a processor or a controller, for example, may be a CPU, a general-purpose processor, a DSP, an ASIC, an FPGA or another programmable logic device, a transistor logic device, a hardware component, or any combination thereof. The processor/controller may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The first communications unit 803 may be a communications interface. The communications interface is a general term. In specific implementation, the communications interface may include a plurality of interfaces, for example, may include an interface between access network devices, an interface between an access network device and a core network device, and/or another interface. The second communications unit 804 may be a transceiver, a transceiver circuit, or the like. The storage unit 801 may be a memory.

Figure 9:
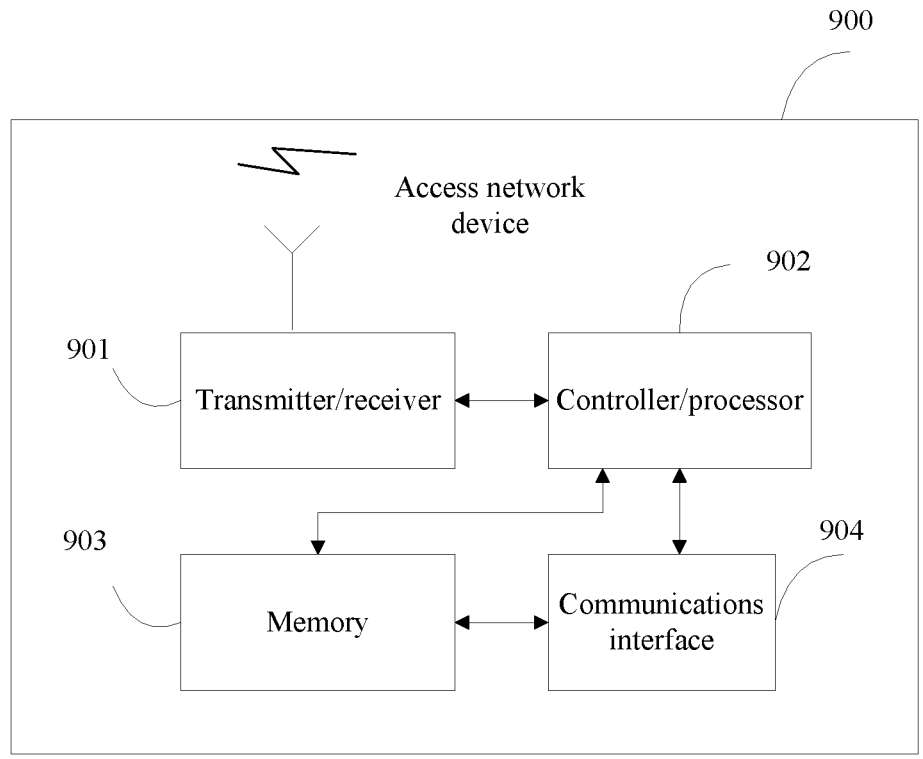
FIG. 9 is a schematic structural diagram of an access network device according to an embodiment of the present disclosure.

When the processing unit 702 is a processor, the first communications unit 703 is a communications interface, the second communications unit 704 is a transmitter/receiver, and the storage unit 701 is a memory, a structure of the first access network device in the embodiments of the present disclosure may be a structure of an access network device shown in FIG. 9. When the processing unit 802 is a processor, the first communications unit 803 is a communications interface, the second communications unit 804 is a transmitter/receiver, and the storage unit 801 is a memory, the second access network device in the embodiments of the present disclosure may also have the structure of the access network device shown in FIG. 9.

FIG. 9 is a possible schematic structural diagram of an access network device according to an embodiment of the present disclosure.

An access network device 900 includes a processor 902 and a communications interface 904. The processor 902 may alternatively be a controller, and is denoted as a "controller/processor 902" in FIG. 9. The communications interface 904 is configured to support the access network device in communicating with another network element (for example, another access network device, a core network device, or the like). Further, the access network device 900 may include a transmitter/receiver 901. The transmitter/receiver 901 is configured to support information sending and receiving between the access network device and the terminal in the foregoing embodiment, and support radio communication between the terminal and another terminal. The processor 902 performs various functions used to communicate with the terminal. On an uplink, an uplink signal from the terminal is received by using an antenna, demodulated by the receiver 901 (for example, a high-frequency signal is demodulated into a baseband signal), and further processed by the processor 902, to restore service data and signaling information that are sent by the terminal. On a downlink, the service data and the signaling information are processed by the processor 902 and modulated by the transmitter 901 (for example, a baseband signal is modulated into a high-frequency signal) to generate a downlink signal, and the downlink signal is sent to the terminal by using the antenna. It should be noted that the foregoing demodulation or modulation function may also be completed by the processor 902.

For example, when the access network device 900 is a first access network device, the processor 902 is further configured to perform processing processes of the first access network device in the methods shown in FIG. 3 to FIG. 6, and/or other processes of the technical solutions described in this application. Alternatively, when the access network device 900 is a second access network device, the processor 902 is further configured to perform processing processes of the second access network device in the methods shown in FIG. 3 and FIG. 4, and/or other processes of the technical solutions described in this application.

Further, the access network device 900 may further include a memory 903, and the memory 903 is configured to store program code and data of the access network device 900.

It may be understood that FIG. 9 shows merely a simplified design of the access network device 900. In actual application, the access network device 900 may include any quantity of transmitters, receivers, processors, controllers, memories, communications units, and the like, and all access network devices that can implement the embodiments of the present disclosure shall fall within the protection scope of the embodiments of the present disclosure.

Figure 10:
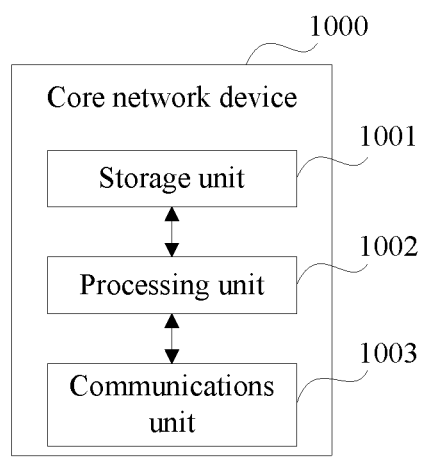
FIG. 10 is a schematic block diagram of a core network device according to an embodiment of the present disclosure.

When an integrated unit is used, FIG. 10 is a possible schematic block diagram of a core network device in an embodiment of the present disclosure. A core network device 1000 includes a processing unit 1002 and a communications unit 1003. The processing unit 1002 is configured to control and manage actions of the core network device. For example, the processing unit 1002 is configured to support the core network device in performing the process 303 in FIG. 3, the processes 4011, 405, and 408 in FIG. 4, and/or other processes of the technical solutions described in this specification. The communications unit 1003 is configured to support communication between the core network device and another network entity (for example, an access network device). The core network device may further include a storage unit 1001, configured to store program code and data of the core network device.

The processing unit 1002 may be a processor or a controller, for example, may be a CPU, a general-purpose processor, a DSP, an ASIC, an FPGA or another programmable logic device, a transistor logic device, a hardware component, or any combination thereof. The processor/controller may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications unit 1003 may be a communications interface, a transceiver, a transceiver circuit, or the like. The communications interface is a general term. In specific implementation, the communications interface may include a plurality of interfaces, for example, may include an interface between the core network device and an access network device, and/or another interface. The storage unit 1001 may be a memory.

Figure 11:
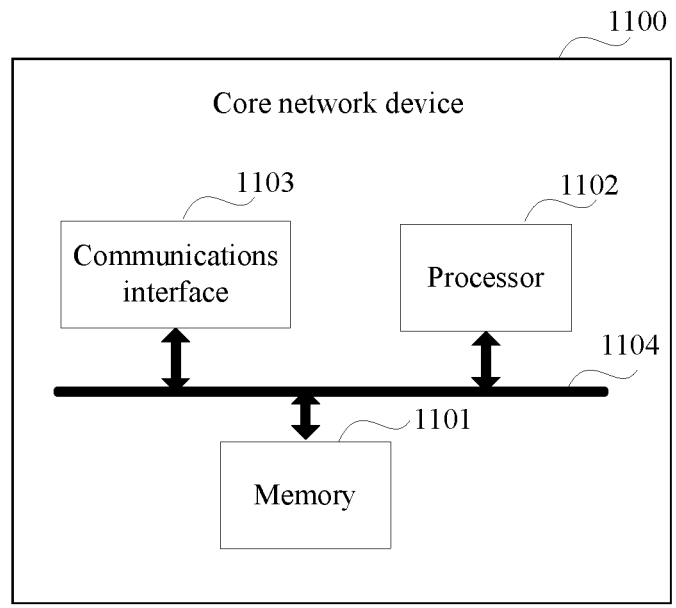
FIG. 11 is a schematic structural diagram of a core network device according to an embodiment of the present disclosure.

When the processing unit 1002 is a processor, the communications unit 1003 is a communications interface, and the storage unit 1001 is a memory, the core network device in this embodiment of the present disclosure may be a core network device shown in FIG. 11.

Referring to FIG. 11, the core network device 1100 includes a processor 1102, a communications interface 1103, and a memory 1101. Optionally, the core network device 1100 may further include a bus 1104. The communications interface 1103, the processor 1102, and the memory 1101 may be connected to each other by using the bus 1104. The bus 1104 may be a peripheral component interconnect (PCI) bus, an extended industry standard architecture (EISA) bus, or the like. The bus 1104 may be classified into an address bus, a data bus, a control bus, and the like. For ease of notation, only one thick line is used to represent the bus in FIG. 11, but this does not mean that there is only one bus or only one type of bus.

Figure 12:
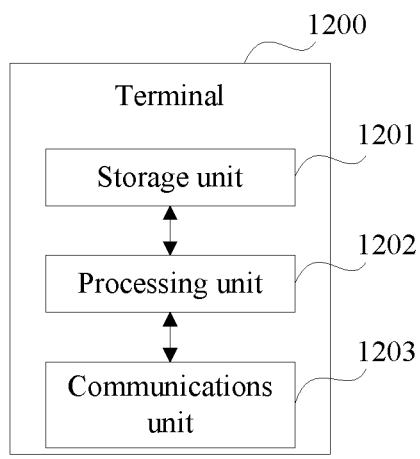
FIG. 12 is a schematic block diagram of a terminal according to an embodiment of the present disclosure.

When an integrated unit is used, FIG. 12 is a possible schematic block diagram of a terminal according to an embodiment of the present disclosure. A terminal 1200 includes a processing unit 1202 and a communications unit 1203. The processing unit 1202 is configured to control and manage actions of the terminal 1200. For example, the processing unit 1202 is configured to support the terminal 1200 in performing the processes 4015, 4021, and 403 in FIG. 4, the processes 501 and 504 in FIG. 5, the processes 601, 603, 605, and 607 in FIG. 6, and/or other processes of the technical solutions described in this specification. The communications unit 1203 is configured to support communication between the terminal 1200 and another network element (for example, an access network device). The terminal 1200 may further include a storage unit 1201, configured to store program code and data of the terminal 1200.

The processing unit 1202 may be a processor or a controller, for example, may be a CPU, a general-purpose processor, a DSP, an ASIC, an FPGA or another programmable logic device, a transistor logic device, a hardware component, or any combination thereof. The processor/controller may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications unit 1203 may be a transceiver, a transceiver circuit, a communications interface, or the like. The storage unit 1201 may be a memory.

Figure 13:
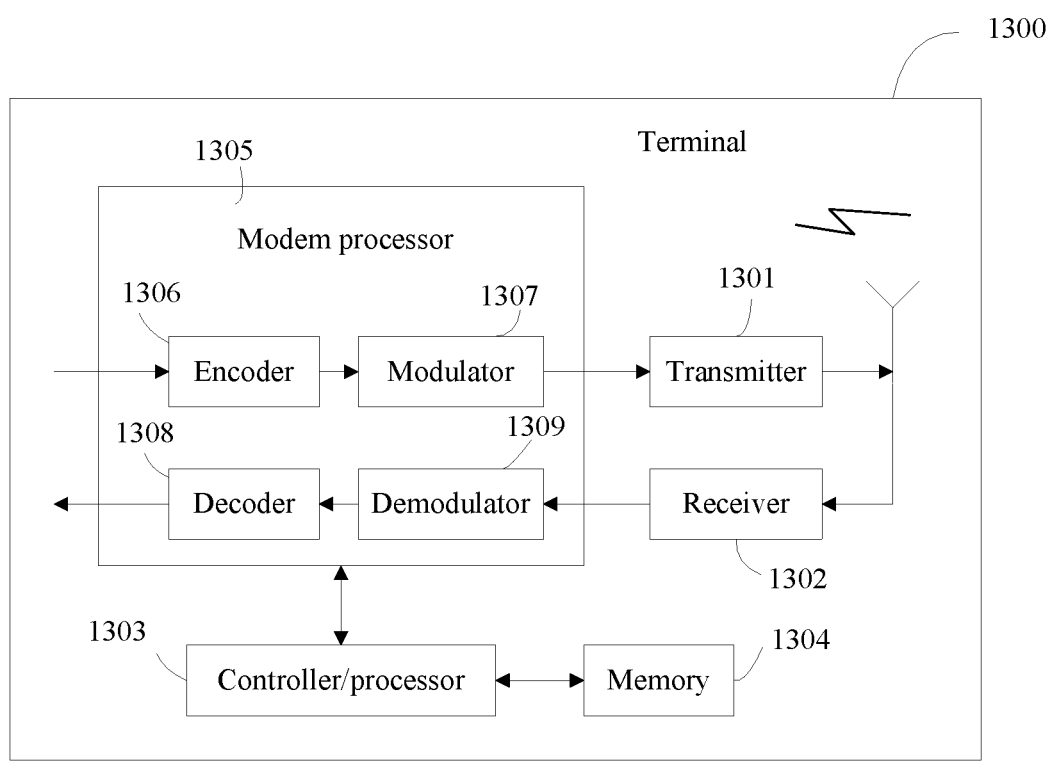
FIG. 13 is a schematic structural diagram of a terminal according to an embodiment of the present disclosure.

When the processing unit 1202 is a processor, the communications unit 1203 is a transceiver, and the storage unit 1201 is a memory, the terminal in this embodiment of the present disclosure may be a terminal shown in FIG. 13.

FIG. 13 is a simplified schematic diagram of a possible design structure of a terminal in an embodiment of the present disclosure. The terminal 1300 includes a transmitter 1301, a receiver 1302, and a processor 1303. The processor 1303 may alternatively be a controller, and is denoted as a "controller/processor 1303" in FIG. 13. Optionally, the terminal 1300 may further include a modem processor 1305, and the modem processor 1305 may include an encoder 1306, a modulator 1307, a decoder 1308, and a demodulator 1309.

In an example, the transmitter 1301 adjusts (for example, performs analog conversion, filtering, amplification, and up-conversion on) an output sample and generates an uplink signal, and the uplink signal is transmitted to the access network device in the foregoing embodiments by using an antenna. On a downlink, the antenna receives a downlink signal transmitted by the access network device in the foregoing embodiments. The receiver 1302 adjusts (for example, performs filtering, amplification, down-conversion, and digitalization on) a signal received from the antenna, and provides an input sample. In the modem processor 1305, the encoder 1306 receives service data and a signaling message that are to be sent on an uplink, and processes (for example, performs formatting, encoding, or interleaving on) the service data and the signaling message. The modulator 1307 further processes (for example, performs symbol mapping or modulation on) encoded service data and an encoded signaling message, and provides an output sample. A demodulator 1309 processes (for example, demodulates) the input sample and provides a symbol estimate. The decoder 1308 processes (for example, performs de-interleaving and decoding) on the symbol estimate, and provides decoded data and a decoded signaling message that are to be sent to the terminal 1300. The encoder 1306, the modulator 1307, the demodulator 1309, and the decoder 1308 may be implemented by the integrated modem processor 1305. These units perform processing according to a radio access technology (for example, access technologies in an LTE system and another evolved system) used by a radio access network. It should be noted that when the terminal 1300 does not include the modem processor 1305, the foregoing functions of the modem processor 1305 may also be completed by the processor 1303.

The processor 1303 controls and manages actions of the terminal 1300, and is configured to perform the processing process performed by the terminal 1300 in the foregoing embodiments of the present disclosure. For example, the processor 1303 is further configured to perform processing processes of the terminal in the methods shown in FIG. 3 and FIG. 6, and/or other processes of the technical solutions described in this application.

Further, the terminal 1300 may further include a memory 1304, and the memory 1304 is configured to store program code and data that are used for the terminal 1300.

The methods or algorithm steps described with reference to the content disclosed in the embodiments of the present disclosure may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may alternatively be a component of the processor. The processor and the storage medium may be located in an ASIC. In addition, the ASIC may be located in the first access network device, the core network device, the second access network device, or the terminal. Certainly, the processor and the storage medium may exist in the first access network device, the core network device, the second access network device, or the terminal as discrete components.

A person skilled in the art should be aware that in the foregoing one or more examples, functions described in the embodiments of the present disclosure may be implemented by hardware, software, firmware, or any combination thereof. When the functions are implemented by software, the functions may be stored in a computer readable medium or transmitted as one or more instructions or code in the computer readable medium. The computer readable medium includes a computer storage medium and a communications medium, and the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present disclosure are further described in detail. It should be understood that the foregoing descriptions are merely specific implementations of the embodiments of the present disclosure, but are not intended to limit the protection scope of the embodiments of present disclosure. Any modification, equivalent replacement, or improvement made based on technical solutions in the embodiments of the present disclosure shall fall within the protection scope of the embodiments of the present disclosure.

What is claimed is:

1. An information sending method, applied to a communications system, wherein the communications system comprises a first access network device and a core network device, and wherein the method comprises:
   receiving, by the first access network device, indication information from a terminal, wherein the indication information indicates that the terminal is to be switched from a light connected state to a connected state, wherein the first access network device does not locally store context information of the terminal in the light connected state;
   determining, by the first access network device and based on the received indication information, that the context information of the terminal is to be obtained;
   sending, by the first access network device, a request message to the core network device, wherein the request message is used to request the context information of the terminal;
   receiving, by the first access network device, a response message from the core network device, wherein the response message carries the context information of the terminal, and wherein the context information of the terminal comprises handover restriction list information indicating reference information used to constrain the first access network device from selecting a service for the terminal or constrain the terminal from moving to a target radio access technology (RAT) or radio access stratum instance; and
   after receiving the response message from the core network device, switching, by the first access network device, the terminal from the light connected state to the connected state by using the context information of the terminal.

2. The method according to claim 1, further comprising:
   sending, by the first access network device, the context information of the terminal to a second access network device.

3. The method according to claim 1, wherein the context information of the terminal further comprises at least one of terminal capability information, security information, or tracking activation information.

4. The method according to claim 3, wherein the security information includes a terminal security capability or a security key, and wherein the tracking activation information includes a tracking code or configuration information of minimization of drive tests (MDT).

5. The method according to claim 1, wherein the handover restriction list information includes restriction information of a public land mobile network (PLMN) or a RAT in which a handover is forbidden.

6. An access network device, wherein the access network device is a first access network device and is applied to a communications system, wherein the communications system comprises the first access network device and a core network device, and wherein the first access network device comprises a memory and at least one processor coupled to the memory, wherein the memory stores program instructions, and wherein when the at least one processor executes the program instructions, the access network device is enabled to perform operations including:
   receiving indication information from a terminal, wherein the indication information indicates that the terminal is to be switched from a light connected state to a connected state, wherein the first access network device does not locally store context information of the terminal in the light connected state;
   determining, based on the received indication information, that the context information of the terminal is to be obtained;
   sending a request message to the core network device, wherein the request message is used to request the context information of the terminal;

receiving a response message from the core network device, wherein the response message carries the context information of the terminal, and wherein the context information of the terminal comprises handover restriction list information indicating reference information used to constrain the first access network device from selecting a service for the terminal or constrain the terminal from moving to a target radio access technology (RAT) or radio access stratum instance; and after receiving the response message from the core network device, switching the terminal from the light connected state to the connected state by using the context information of the terminal.

7. The access network device according to claim 6, wherein the operations further include:

sending the context information of the terminal to a second access network device.

8. The access network device according to claim 6, wherein the context information of the terminal further comprises at least one of terminal capability information, security information, or tracking activation information.

9. The access network device according to claim 8, wherein the security information includes a terminal security capability or a security key, and wherein the tracking activation information includes a tracking code or configuration information of minimization of drive tests (MDT).

10. The access network device according to claim 6, wherein the handover restriction list information includes restriction information of a public land mobile network (PLMN) or a RAT in which a handover is forbidden.

11. A communications system, comprising a first access network device and a core network device, wherein a connection for a terminal exists between the first access network device and the core network device;

wherein the first access network device is configured to:
receive indication information from a terminal, wherein the indication information indicates that the terminal is to be switched from a light connected state to a connected state, wherein the first access network device does not locally store context information of the terminal in the light connected state;
determine, based on the received indication information, that the context information of the terminal is to be obtained;
send a request message to the core network device, wherein the request message is used to request the context information of the terminal;
receive a response message from the core network device, wherein the response message carries the context information of the terminal, and wherein the context information of the terminal comprises handover restriction list information indicating reference information used to constrain the first access network device from selecting a service for the terminal or constrain the terminal from moving to a target radio access technology (RAT) or radio access stratum instance; and
after receiving the response message from the core network device, switch the terminal from the light connected state to the connected state by using the context information of the terminal; and wherein the core network device is configured to:
receive the request message from the first access network device; and
send the response message to the first access network device.

12. The communications system according to claim 11, wherein the context information of the terminal further comprises at least one of terminal capability information, security information, or tracking activation information.

13. The communications system according to claim 12, wherein the security information includes a terminal security capability or a security key, and wherein the tracking activation information includes a tracking code or configuration information of minimization of drive tests (MDT).

14. The communications system according to claim 11, wherein the handover restriction list information includes restriction information of a public land mobile network (PLMN) or a RAT in which a handover is forbidden.

* * * * *